Figure 1:
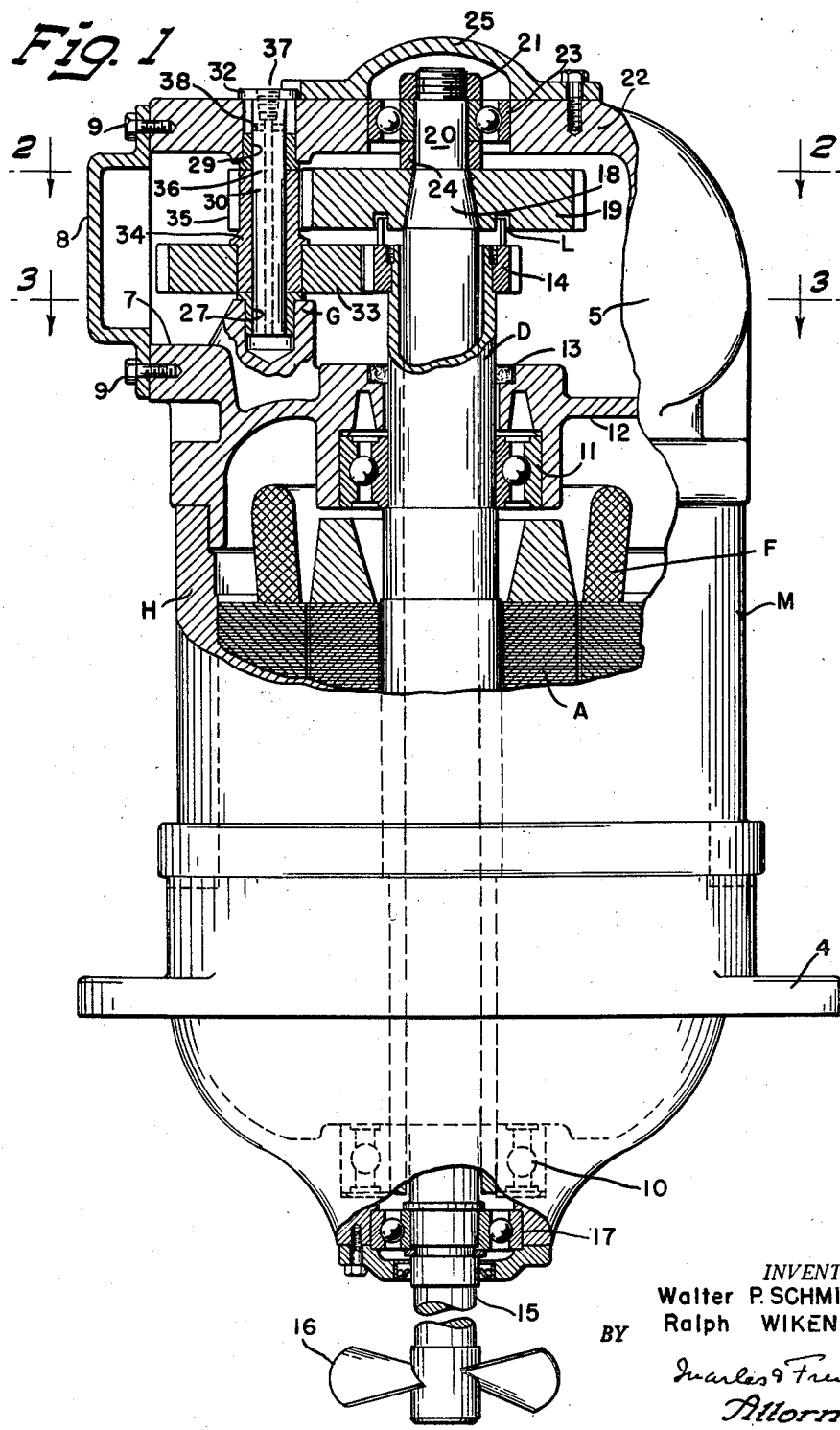

March 1, 1960

W. P. SCHMITTER ET AL 2,926,542

PORTABLE REDUCTION GEAR UNIT

Filed Aug. 7, 1957

2 Sheets-Sheet 1

INVENTORS
Walter P. SCHMITTER &
Ralph WIKEN
BY
Charles & French
Attorneys

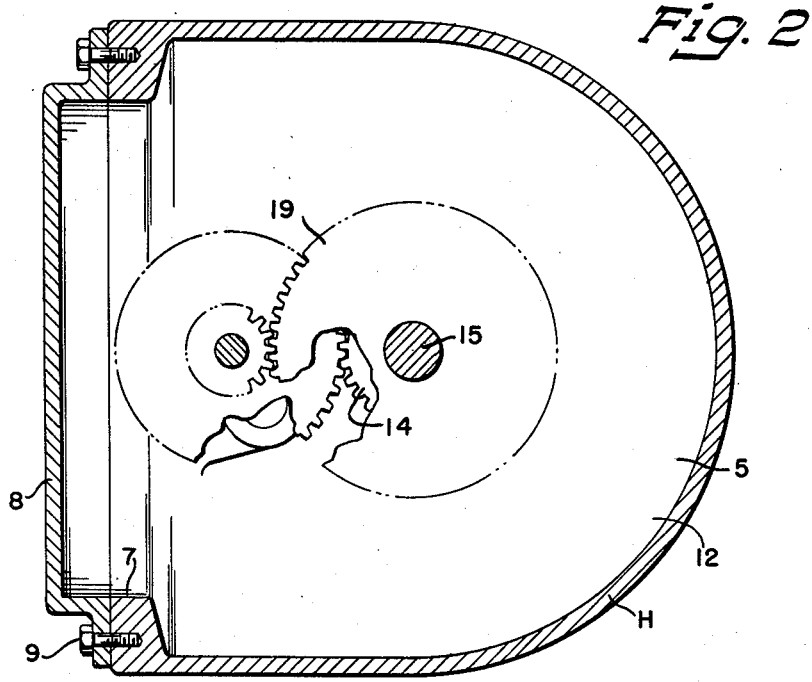
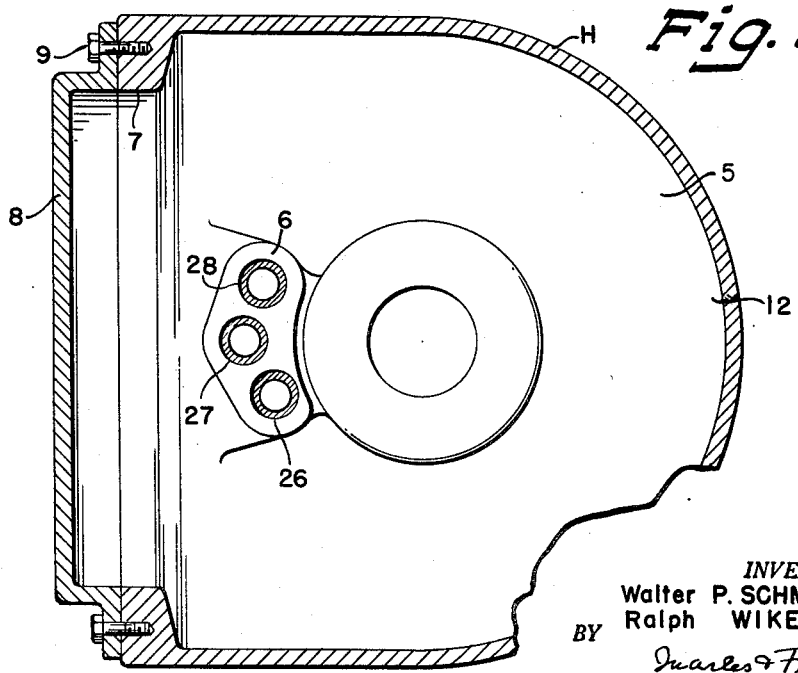

United States Patent Office 2,926,542
Patented Mar. 1, 1960

2,926,542

PORTABLE REDUCTION GEAR UNIT

Walter P. Schmitter, Wauwatosa, and Ralph Wiken, Bayside, Wis., assignors to The Falk Corporation, Milwaukee, Wis., a corporation of Wisconsin Application August 7, 1957, Serial No. 676,885

4 Claims. (Cl. 74—421)

The invention relates to a portable geared transmission unit.

The main object of the invention is to provide a geared transmission mechanism for driving agitators, mixers and the like at a predetermined selected speed in which a plurality of predetermined speeds are available by the use of a plurality of interchangeable change speed gears adapted to mesh with a fixed gear on the drive shaft and a fixed gear on the driven shaft to effect the desired gear reduction without disturbing either the driving source or the driven equipment.

A further object of the invention is to incorporate the above referred to transmission as a part of a geared head motor whose drive shaft carries the drive gear of the transmission and is hollow, and the driven shaft extends through the motor drive shaft and carries the driven gear and projects beyond the motor housing.

A further object of the invention is to provide a motor driven speed reduction unit in which one end of the motor housing has a cavity provided on its inner side with an entablature having a series of radially disposed shaft mounting holes aligning with a similar set of holes on its opposite side for the reception of a shaft removable from said end, said cavity having a side opening by which change gears may be mounted on said shaft when aligned with one of said sets of holes in driving relation with the drive and driven gears previously referred to, said sets of holes being disposed at different radial distances from the common axis of said drive and driven gears so that different sets of change gears may be used to obtain a predetermined speed.

A further object of the invention is to provide a motor driven geared transmission in which the motor housing has a mounting flange at one end and the shaft to be driven extends through the armature shaft of said motor at right angles to said flanged mounting.

The invention further consists in the several features hereinafter set forth and more particularly defined by claims at the conclusion hereof.

In the drawings:

Fig. 1 is a front elevation view of a transmission unit embodying the invention, parts being taken away and parts being shown in section, Fig. 2 is a detailed horizontal sectional view taken on the line 2—2 of Fig. 1, and Fig. 3 is a detailed horizontal sectional view taken on the line 3—3 of Fig. 1.

Referring to Fig. 1, the letter M designates an electric motor having a housing H, field coils F, armature A and a hollow drive shaft D carrying said armature.

At one end, housing H is provided with mounting flanges 4 apertured as usual for the reception of bolts or other suitable fastening means by which the unit may be mounted in the desired position. The other ends of housing H has a cavity 5 formed therein, having an entablature 6 on its inner wall and an access opening 7 at one side normally closed by a cover plate 8 removably secured to said housing by screws 9.

The motor shaft or hollow drive shaft D is journaled in spaced bearings 10 and 11 mounted in the motor housing, the bearing 10 being disposed at the lower or front end of said housing and the bearing 11 being disposed in the partition wall 12 of said housing forming the inner side of cavity 5 which also has an oil sealing ring 13 surrounding said shaft. The upper or outer end of shaft D projects into cavity 5 and has a pinion or gear 14 fixedly mounted thereon.

A driven shaft 15 extends through shaft D and projects therefrom at its lower end the desired distance and at this end may have an agitator 16 or other device to be driven mounted thereon. Shaft 15 also at its lower end is journaled in a suitable oil sealed bearing 17 mounted in the housing beyond the lower end of drive shaft D. Shaft 15 at its upper end extends above drive shaft D and has a tapered portion 18 to receive a driven gear 19 and a reduced diameter portion 20 threaded at its outer end to receive a nut 21.

The upper or outer end wall 22 of the housing has an opening aligned with the axis of shaft D to receive a bearing 23, the inner race of which is clamped to shaft 15 between the nut 21 and a spacer sleeve 24 bearing at its opposite side on the gear 19. This apertured end of the housing is sealed off by a cap 25 secured to the flat end face of wall 22. Thus the cavity 5 forms a sealed in space for the reception of oil to lubricate the transmission.

The gears 14 and 19 have their hub portions formed to provide a labyrinth seal L to prevent oil in the cavity getting into the shaft D. The seal, as shown in Fig. 1, comprises a ring on gear 14 working in a groove in gear 19.

The entablature 6 has a series of bushing lined holes 26, 27 and 28, as shown in Fig. 3, whose axes are parallel to the axes of shafts D and 15 and are radially disposed at different distances therefrom. The outer end wall 22 has similar bushed openings axially aligned with the holes 26, 27 and 28, one of which, 29, is indicated in Fig. 1.

A pull pin or shaft or gear carrying shaft 30 is adapted to be mounted in any one of the sets of aligned bushed holes in the opposite sides of the cavity 5 and has flanged end 32 engaging the wall 22 adjacent any selected opening in said wall.

Plural sets of change gears are provided for mounting on the pin or shaft 30, one set being shown in Fig. 1, comprising a gear 33 meshing with the drive gear 14 and mounted on an extension 34 of the hub of a pinion or gear 35 meshing with the driven gear 19.

Attachment of the gears of any change speed gear set may be effected by removing cover plate 8, inserting this gear set into the cavity 5 so that the gears thereof mesh with their companion gears and so that their apertured hub portion aligns with the proper holes and then inserting the pin 30 progressively through the outer bushed hole, the gears and the inner bushed hole.

The pin 30 may have a longitudinally extending hole 36 with a removable plug 37 at its outer end and with cross passages 38 so that grease or oil may be injected into these passages for lubricating purposes.

With the selected change speed gears in position, the cavity is charged with lubricant and the cover 8 is replaced and the unit is now ready for use. The rotation of drive shaft D of the motor through the meshing gears 14 and 33 effects one reduction and the intermeshing gears 35 and 19 effects a second reduction.

By reason of the mounting flanges 4 the device may be mounted on any suitable support associated with a container so that the stirrer or agitator end of the shaft 15 will be extended down into the container for mixing its contents.

We desire it to be understood that this invention is not to be limited to any particular form or arrangement of parts except insofar as such limitations are included in the appended claims.

We claim:

1. In a portable gear reduction drive mechanism including a housing, the combination of a motor driven drive shaft having a gear fixed thereto, a driven shaft having a gear fixed thereto, the gears on said shafts being disposed adjacent each other, said shafts being coaxially arranged, a gear carrying shaft in spaced parallel relationship with said coaxially arranged shafts, a pair of replaceable intermediate gears arranged for mounting in axially spaced relationship on said gear carrying shaft, each of said gears being of a selected diameter and arranged to mesh with a respective one of the gears on said drive and driven shafts, and means arranged to permit substitution of intermediate gears of selected diameters differing from the diameters of said pair of said replaceable gears, said means comprising a support member adjacent said coaxially arranged shafts having sets of shaft mounting holes spaced from one another at different radial distances from the common axis for said drive and driven shafts, said sets of support member holes being adapted to removably receive said gear carrying shaft, and an access opening in the housing through which intermediate gears may be passed whereby said shaft and its respective pair of intermediate gears may be selectively removably mounted in a respective set of holes for operative relationship with said coaxially arranged gears.

2. In a portable gear reduction drive mechanism, the combination of an electric motor having a hollow drive shaft and a housing having a cavity into which one end of said drive shaft projects, said cavity having a laterally disposed access opening, a removable cover for said opening, a driven shaft journaled in said housing and extending through said drive shaft in coaxial relation therewith and projecting beyond one end of said motor, a gear in said cavity fixed to said drive shaft, a gear in said cavity fixed to said driven shaft adjacent and outwardly of said first named gear, a gear carrying shaft in spaced parallel relationship with said coaxially arranged shafts, a pair of replaceable intermediate gears arranged for mounting in axially spaced relationship on said gear carrying shaft and introducible into said cavity through said opening, each of said gears being of a selected diameter and arranged to mesh with a respective one of the gears on said drive and driven shafts, and means arranged to permit substitution through said opening of intermediate gears of selected diameters differing from the diameters of said pair of said replaceable gears, said means comprising a support member adjacent said coaxially arranged shafts having sets of shaft mounting holes spaced from one another at different radial distances from the common axis for said drive and driven shafts, said sets of support member holes being adapted to removably receive said gear carrying shaft, whereby said shaft with its respective pair of intermediate gears may be selectively removably mounted in a respective set of holes for operative relationship with said coaxially arranged gears.

3. In a portable gear reduction drive mechanism, the combination of an electric motor having an armature, a housing, a hollow drive shaft mounted on said armature and journaled in said housing, a driven shaft journaled in bearings at the ends of said housing and extending coaxially through said drive shaft and projecting beyond said housing at one end, the opposite end of said housing formed to provide a cavity having a laterally disposed access opening, a removable cover for said opening, a gear in said cavity fixed to said drive shaft, a gear in said cavity fixed to said driven shaft adjacent and outwardly of said first named gear, a gear carrying shaft, a pair of replaceable intermediate gears each having an axial bore to receive said gear carrying shaft, each of said gears being of a selected diameter and arranged to mesh with a respective one of the gears on said drive and driven shafts, and means arranged to permit substitution of intermediate gears of selected diameters differing from the diameters of said pair of said replaceable gears, said means comprising oppositely disposed walls in said cavity above and below said intermediate gears provided with aligned sets of shaft mounting holes spaced from one another at different radial distances from the common axis for said drive and driven shafts, each set of support member holes being adapted to removably receive said gear carrying shaft, whereby said shaft with its respective pair of intermediate gears may be selectively removably mounted in a respective set of holes for operative relationship with said coaxially arranged gears.

4. Portable gear reduction drive mechanism as defined in claim 2 wherein shaft and gear seals are provided to permit said cavity to act as a lubricant retainer.

References Cited in the file of this patent

UNITED STATES PATENTS

| | | |
|---|---|---|
| 1,472,588 | H'Doubler | Oct. 30, 1923 |
| 1,840,007 | Ames | Jan. 5, 1932 |
| 2,121,897 | Wood | June 28, 1938 |
| 2,600,677 | Schmitter | June 17, 1952 |
| 2,703,847 | Kalikow | Mar. 8, 1955 |
| 2,744,415 | Gaubatz | May 8, 1956 |

FOREIGN PATENTS

| | | |
|---|---|---|
| 594,954 | Great Britain | Nov. 24, 1947 |